United States Patent

Chikazawa et al.

[11] Patent Number: 6,015,281
[45] Date of Patent: Jan. 18, 2000

[54] INJECTION MOLDING MACHINE HAVING A HEATED NOZZLE TOUCH PLATE

[75] Inventors: Motonori Chikazawa; Kohichi Kakinaka, both of Ohbu; Shozo Honda, Toyama-ken, all of Japan

[73] Assignees: Kabushiki Kaisha Meiki Seisakusho, Ohbu; Sanko Gosei Ltd., Nishi Tonami, both of Japan

[21] Appl. No.: 09/102,117

[22] Filed: Jun. 22, 1998

[30] Foreign Application Priority Data

Jun. 23, 1997 [JP] Japan ................................ 9-165714
Apr. 27, 1998 [JP] Japan ................................ 10-116656

[51] Int. Cl.$^7$ .................................................... B29C 45/23
[52] U.S. Cl. ...................... 425/226; 264/39; 264/328.11; 425/547; 425/574
[58] Field of Search .................................. 475/226, 547, 475/574; 264/39, 328.11

[56] References Cited

U.S. PATENT DOCUMENTS 4,808,355  2/1989  Kamiyama et al. ..................... 425/574

FOREIGN PATENT DOCUMENTS 3-64724 U   6/1991   Japan .
4-107015 U  9/1992   Japan .

*Primary Examiner*—Tim Heitbrink
*Attorney, Agent, or Firm*—Oliff & Berridge, PLC

[57] ABSTRACT

In an injection molding machine, a fixed platen 2 is provided with an air cylinder 11 through a bracket 13 and a nozzle touch plate 10 is coupled to an end of a piston rod 12 of the air cylinder 11. The piston rod 12 is extendably and contractedly driven so that the nozzle touch plate 10 is moved forward and backward between a closed position where the tip opening 9a of the nozzle 9 can be closed and a retreated position where the opening 9a can be opened. On the nozzle touch plate 10, a spherical recess portion slightly larger in radius than the tip sphere of the nozzle 9 is formed as an abutment portion 10a, and a heater 14 for adjusting the temperature is disposed in the nozzle touch plate 10. Alternatively, a passage may be formed in the nozzle touch plate 10 so that a medium of an optimum temperature can be circulated and supplied.

2 Claims, 5 Drawing Sheets

F I G. 5
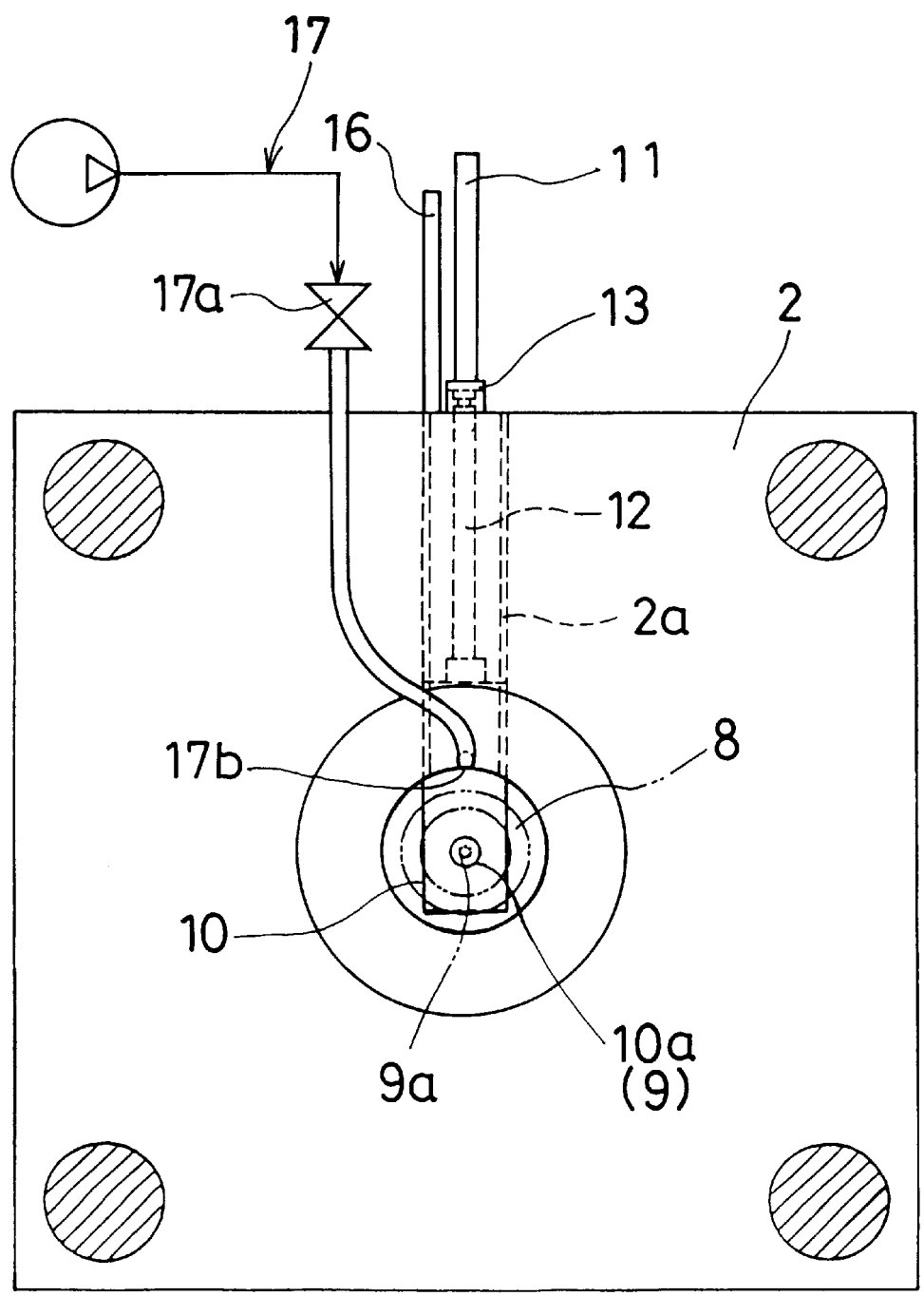

INJECTION MOLDING MACHINE HAVING A HEATED NOZZLE TOUCH PLATE

BACKGROUND OF THE INVENTION

1. Field of the Invention

The present invention relates to an injection molding machine and more particularly to an injection molding machine having a nozzle touch plate that enables a tip opening of a nozzle of a heating cylinder to close and open for enabling a plasticizing and measuring process to be carried out without contacting the nozzle to a fixed die or making it an open state.

2. Description of the Related Art

A process of one molding cycle in an injection molding machine includes a plasticizing and measuring process in which a resin material supplied in a heating cylinder is melted and plasticized by a rotating screw or the like and a predetermined amount of the resin material melted and plasticized is reserved in a front portion of the heating cylinder. The temperature at which the resin material is melted and plasticized changes depending on the resin materials, and the temperature for a die is set according to molding conditions such as the temperature at which the resin material is melted and plasticized and the configuration of a molding product.

There are a case in which the plasticizing and measuring process of the resin material is conducted in a state where a nozzle disposed on a tip of the heating cylinder is in contact with the fixed die (called "nozzle touch"), and a case in which the plasticizing and measuring process is carried out with the nozzle being moved backward so as to be apart from the fixed die.

When the plasticizing and measuring process is carried out in the nozzle touch state in repeating the molding cycle, if the temperature of the fixed die is set to be lower than the temperature of the molten resin material, the heat of the nozzle is transmitted to the fixed die to lower the temperature of the nozzle, as a result, the material is solidified in the nozzle so that the nozzle is clogged. Also, if the temperature of the fixed die is set higher than the temperature of the molten resin material, the temperature of the nozzle rises due to the transmission of the heat from the fixed die, as a result of which the material is hardened in the nozzle so that the nozzle is clogged. In any case, it may be difficult to carry out the continuous molding.

In order to eliminate the above problems, it is normal that the nozzle is displaced backward and spaced from the fixed die every time the injection in the molding cycle is finished. However, in the case where the plasticizing and measuring process is carried out in a state where the nozzle is moved back and spaced from the fixed die, there arise such problems that the molten resin material leaks from the nozzle due to the back pressure of the screw to lack the amount of the measured molten resin, that the surroundings are stained with the molten resin material or that the resin material remains in excess. Also, it is likely to occur such problems that the tip of the nozzle is cooled whereby the molten and plasticized resin material is deteriorated in fluidity to interfere with the injection process, or the physical properties of the molding product become uniform.

As the conventional prior art for coping with the above problems, there has been known, as disclosed in Japanese Utility Model Laid-Open Publication No. Hei 4-107015, an injection molding machine which moves an injection unit forward and backward to bring the injection nozzle in contact with and apart from the fixed die, and also which includes means for stopping the injection nozzle at a closed position and a closing member that renders the tip opening of the nozzle close. In this injection molding machine, the tip opening of the nozzle which is moved backward and spaced from the fixed die and stopped at the closed position is closed by the closing member during the measuring process, so that the resin material is prevented from leaking from the nozzle even if the screw is moved backward while applying a back pressure to the screw.

Also, as another prior art, there has been known, as disclosed in Japanese Utility Model Laid-Open Publication No. Hei 3-64724, in a heating device for an injection molding nozzle which makes the nozzle contact with the die at every injection molding, the nozzle tip portion is surrounded and heated by a heat retaining ring while the die is apart from the nozzle and the heat retaining ring is made apart from the nozzle tip portion while the die is in contact with the nozzle. Since this heating device is designed in such a manner that the heat retaining ring is automatically set to the nozzle tip portion while the die is opened and a product is taken out from the die after injection molding, and the heat retaining ring surrounds and rapidly heats the nozzle tip, and at the time of injection the heat retaining ring is separated and moved backward from the nozzle tip immediately before the nozzle tip is brought in contact with the die, there is no occurrence in which the molten resin is semi-solidified or partially solidified in a nozzle passage so that the melting state can be kept for the succeeding injection, and the nozzle tip can be prevented from being cooled.

However, in the device disclosed in Japanese Utility Model Laid-Open Publication No. Hei 4-107015 of the above-described prior art the means for making the injection nozzle contact to and leave apart from the fixed die requires also a function for stopping the injection nozzle at the closed position, and that, since the closing member is set in a state as a cantilever, the tip opening of the nozzle can merely contact to the closing member at the closed position, as a result there has been a problem in which the resin material cannot be surely prevented from leaking from the nozzle during the plasticizing and measuring process. Also, there arises another problem, in which, since the closing member contacts to the nozzle, the heat of the nozzle is transmitted to the closing member and the temperature of the nozzle is lowered, whereby the resin material is solidified or hardened in the nozzle to cause the nozzle is to be clogged, thereby a continuous molding cannot be carried out. Further, because the device is of the type to stop the injection nozzle at the closed position, there arises another problem in which it takes time to make the injection nozzle contact to or leave apart from the fixed die from the stopped state, and as a result the efficiency per molding cycle cannot be attained.

Also, in the device disclosed in Japanese Utility Model Laid-Open Publication No. Hei 3-64724 of the above-described prior arts, while the nozzle leaving apart from the die, the tip of the nozzle is merely surrounded and heated by the heat retaining ring, in addition, the division-type heat retaining ring is used for separating and moving backward the heat retaining ring from the nozzle tip immediately before the nozzle tip contacts to the die, and which does not contain the technical idea that the nozzle is closed, so that a problem that the material kept in a melt state leaks from the nozzle has not been solved.

Further, the heat retaining ring disclosed in Japanese Utility Model Laid-Open Publication No. Hei 3-64724 and the closing member disclosed in Japanese Utility Model Laid-Open Publication No. Hei 4-107015 have a problem that foreign materials are stuck to them due to drooling and the like at the time of the nozzle touch and interposed between the nozzle and those members to cause malfunction, thereby disabling continuous molding.

SUMMARY OF THE INVENTION

The present invention has been made to advantageously solve the above problems of the prior art, and therefore an object of the present invention is to provide an injection molding machine which does not need to stop injection unit to be stopped at a closed position enables a nozzle opening to rapidly abut against a closing member with a sufficient pressure force to surely close the nozzle opening, can surely prevent a resin material from leaking from a nozzle during a plasticizing and measuring process, and can perform continuous molding without any problem while the temperature of the resin material is held in a state suitable for injection, thus being capable of attaining an improvement in molding efficiency.

Another object of the present invention is to provide an injection molding machine which can prevent foreign material to be stuck due to drooling or the like from being interposed between the closing member and the nozzle, thereby being capable of performing continuous molding without any malfunction.

In order to attain the above object, an injection molding machine according to an invention of described in claim 1 is characterized in that said machine comprises a heating cylinder for injecting a molten and plasticized resin material from a tip opening of a nozzle into a cavity formed in a die, a shift means for shifting the heating cylinder forward and backward with respect to the die and pressing the nozzle against the die, a nozzle touch plate for enabling the tip opening of the nozzle of the heating cylinder to be closed and opened, and a temperature adjusting means for adjusting the temperature of the nozzle touch plate, wherein the nozzle touch plate is provided to be able to support the pressing force by the shift means when the tip opening of the nozzle of the heating cylinder is closed.

Also, according to an invention described in claim 2, in an injection molding machine as defined in the invention described in claim 1, it is characterized to be provided with a foreign material removing means for removing foreign materials stuck to the nozzle touch plate In the injection molding machine according to the invention described in claim 1, when starting the plasticizing and measuring process, by displacing the heating cylinder close to the die with the shift means in a state where the nozzle touch plate is positioned between the die and the nozzle of the heating cylinder, the nozzle is pressured against the nozzle touch plate in such a manner that the tip opening of the nozzle is closed by the nozzle to the nozzle touch plate. In this case, because the nozzle touch plate is provided so as to be against the pressing force by the shift means in such a manner as it can support the force, the tip opening of the nozzle is surely closed and the forward movement of the heating cylinder by the shift means is stopped. When the resin material supplied in the heating cylinder is melted and plasticized while being kneaded by a rotating screw or the like and a predetermined amount of the resin material is reserved in a front portion of the heating cylinder, the screw is moved backward and thereby a back pressure caused by the backward movement of the screw is applied to the molten and plasticized resin material reserved in the front portion of the heating cylinder, however, since the nozzle is pressed against the nozzle touch plate, the resin material is surely prevented from leaking from the tip opening of the nozzle. Further at this time, by a temperature regulating means, since the nozzle touch plate is heated to a temperature suitable for a resin material to be used or controlled to a temperature appropriate therefore, the temperature of the nozzle does not decrease or increase to prevent the resin material from being solidified or hardened in the nozzle, clogged in the nozzle and disabling the continuous molding.

Also, in the injection molding machine according to the invention described in claim 2, the foreign material stuck to the nozzle touch plate is removed by the foreign material removing means until the tip opening of the nozzle is closed by displacing the nozzle in such a manner that the nozzle is pressed against the nozzle touch plate from a state in which the nozzle touch plate is situated between the die and the nozzle of the heating cylinder. Because the foreign materials stuck to the nozzle touch plate caused by drooling and such are removed, the nozzle touch plate and the nozzle are free of sandwiching the foreign materials between them when the nozzle is displaced for the nozzle touch, thereby the continuous molding can be carried out without any erroneous operation.

BRIEF DESCRIPTION OF THE DRAWINGS

The object and features of the present invention will become more apparent from the consideration of the following detailed description of the present invention based on the accompanying drawings in which:

FIG. 5 is a front view showing an embodiment in which foreign material removing means of the nozzle touch plate is provided.

DETAILED DESCRIPTION OF THE PREFERRED EMBODIMENTS

Now, a description will be given in more detail of preferred embodiments of the present invention based on FIGS. 1–3. Identical or corresponding parts are indicated by like references, and their explanation will be omitted.

An injection molding machine according to the present invention comprises in general, a heating cylinder for injecting a molten and plasticized resin material from a tip opening of a nozzle into a cavity formed in a die, shift means for enabling to displace the heating cylinder forward and backward with respect to the die and pressing the nozzle against the die, a nozzle touch plate for enabling the tip opening of the nozzle of the heating cylinder to close and open, and a temperature adjusting means for adjusting the temperature of the nozzle touch plate, wherein the nozzle touch plate is provided to enable the pressing force by the shift means to be supported when the tip opening of the nozzle of the heating cylinder is closed.

Figure 1:
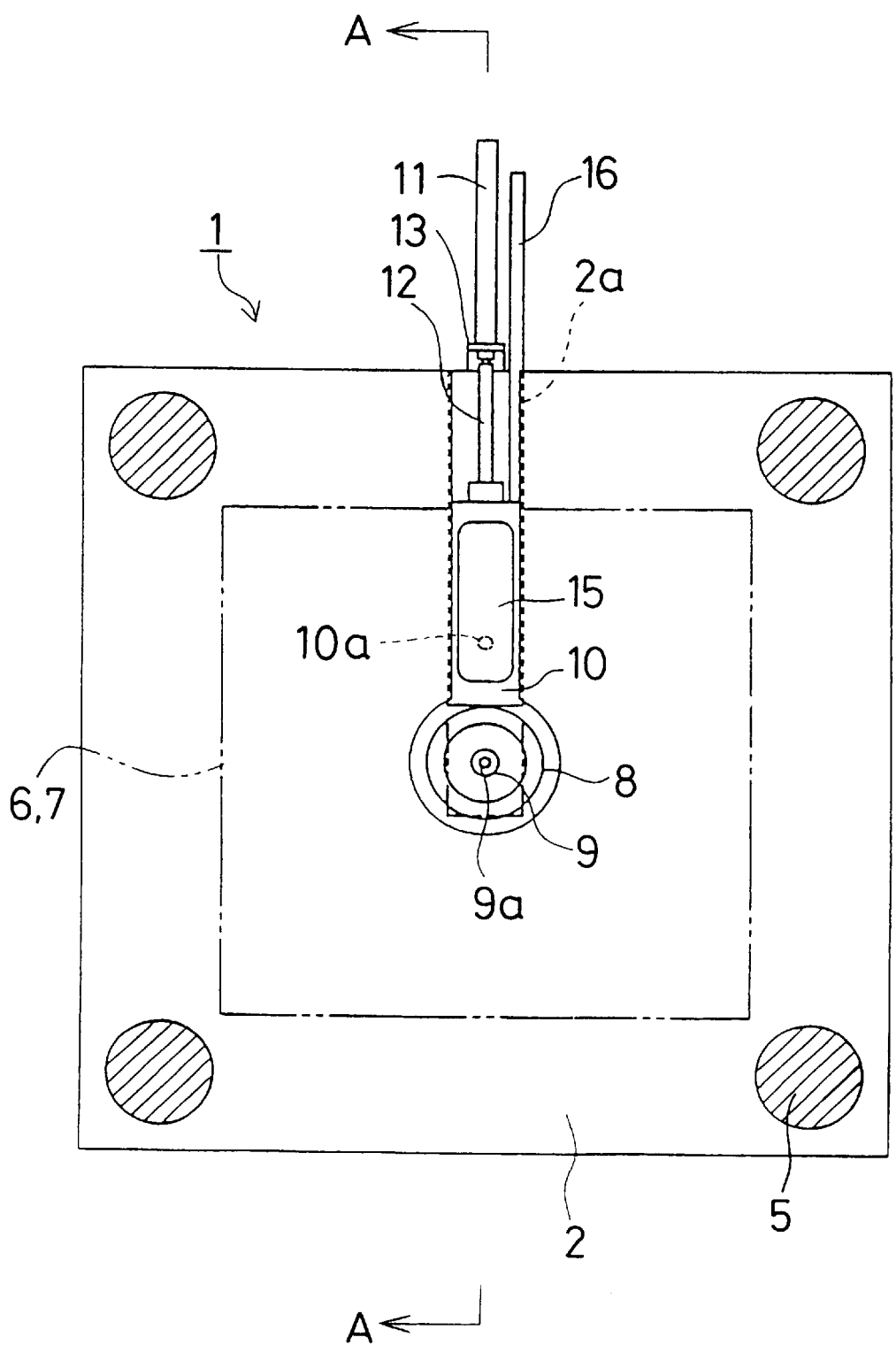
FIG. 1 is a front view showing the main portion of a molding unit according to the present invention.
Figure 2:
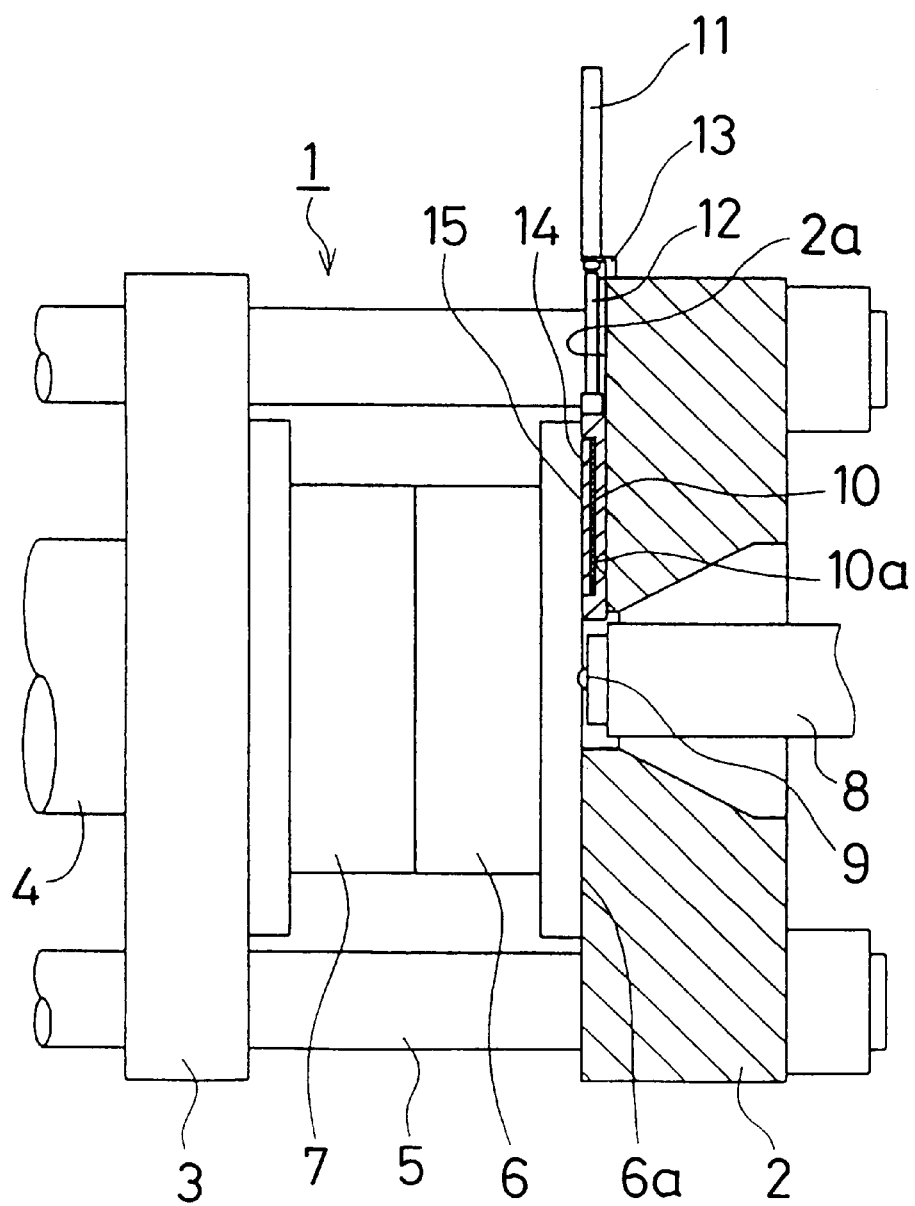
FIG. 2 is a side view showing the molding unit of FIG. 1 with a partial cross-section taken along a line A—A of FIG. 1.

FIGS. 1 and 2 show only the main portion of an injection molding machine (hereinafter referred to as "molding machine") 1.

The molding machine 1 is designed in such a manner that a fixed platen 2 and a movable platen 3 are opposed to each other, and the movable platen 3 can be come close to or apart from the fixed platen 2 along four stays 5 according to the forward and backward movement of a die clamping ram 4. A fixed die 6 is mounted on a surface of the fixed platen 2 which is opposite to the movable platen 3. Reference sign 6a shown in the figures denotes a mounting surface of the fixed die 6 to the fixed platen 2. The movable die 7 is mounted on the surface of the movable platen 3 opposite to the fixed platen 2. When the movable die 7 is so moved as to approach the fixed die 6 to abut against the fixed die 6 by the operation of the die clamping ram 4, both dies are closed and clamped, a cavity (not shown) is formed inside of both the dies 6 and 7. Also, when the movable die 7 is moved apart from the fixed die 6, the dies 6 and 7 are opened, so that a molding product can be taken out.

A screw (not shown) is rotatably and reciprocatingly inserted in the inner hole of a heating cylinder 8 to constitute an injection unit. A nozzle 9 is mounted on a tip (forward) of the heating cylinder 8 at the fixed platen side. Reference sign 9a shown in the figures denotes a central opening of the nozzle 9. The heating cylinder 8 is supported so as to be movable forward and backward in such a manner that the nozzle 9 abuts against and moves apart from a sprue bush (not shown) on the fixed die 6, and is displaced by, for example, a hydraulically-driven shift cylinder (not shown) as shift means. The resin material supplied in the inner hole of the heating cylinder 8 is heated by the rotation and such of the screw about its axis so as to be melted and plasticized, and a predetermined amount of the resin material is then reserved in a front portion of the heating cylinder 8 (a plasticizing and measuring process). In this situation, the screw is located at a position where it is moved backward in the heating cylinder 8 and when the dies 6 and 7 are clamped and the nozzle abuts against the sprue bush, the screw is made to move forward, thereby the resin material plasticized and measured is injected into the cavity formed by the dies 6 and 7 through the nozzle and the sprue bush. At this time, in order to avoid the sprue bush of the die and the nozzle from being opened by the injecting force, a nozzle touch force that allows the nozzle 9 to be pressed against the sprue bush of the fixed die 6 with a predetermined force is added by the shift cylinder. The nozzle touch force is, for example, about 5 tons in the case of the molding machine having a 200 tons clamping force. Then, the fixed die 6 is fixed on the fixed platen 2 in order to be able to resist against such pressure as the nozzle touch force.

A dovetail groove 2a is formed in the fixed platen 2, and in which a nozzle touch plate 10 is disposed slidably and movably in contact with the mounting surface 6a of the fixed plate 6 (this state is called "backup"). Further, the fixed platen 2 is; provided with an air cylinder 11 through a bracket 13, and the nozzle touch plate 10 is coupled to an end of a piston rod 12 of the air cylinder 11.

By the extending and contacting of the piston rod, the nozzle touch plate 10 is moved forward and backward between the closed position (FIG. 3) where the tip opening 9a of the nozzle 9 can be closed and the retreated position (FIG. 2) where the tip opening 9a can be opened. In the embodiment shown in the figures, the nozzle touch plate 10 is displaced in the closed position when the piston rod 12 of the air cylinder 11 is driven to be extended and in the retreated position when the piston rod 12 is driven to be contracted. However, the present invention is not limited to this structure, and it may be structured in such a manner that, when the piston road 12 is driven to be extended, the nozzle touch plate 10 is displaced to the retreated position, and when the piston rod 12 is driven to be contracted, the nozzle touch plate 10 is displaced to the closed position. Also, the forward and backward drive of the nozzle touch plate can be made by a hydraulic cylinder instead of the air cylinder, alternatively, it may be structured that a rack is formed on the side of the nozzle touch plate 10 and engaged with a pinion rotatable by a geared motor or the like. Moreover, the forward and backward moving direction of the nozzle touch plate 10 is not limited to the vertical direction of the molding machine 1, but may be a horizontal direction, further, the forward and backward movement is not limited by or to straight, but it may be structured in such a manner that the forward and backward movement is made between the closed position and the retreated position by rotating the nozzle touch plate 10.

Now, when practicing the present invention, although, in the case where a die which has a die positioning means such as a support roller and a stopper on the surface of a base platen (a fixed platen and a movable platen) (in that case mostly automatic-detachable device is provided) and is free of a locating ring is used, there is no need of consideration at all, as to the die having the locating ring, in order to prevent the die from being interfered with the nozzle touch plate 10, a cutout larger in width than the dovetail groove 2a, that is, at least larger than the width of the nozzle touch plate 10 is formed in the locating ring (not shown) of the fixed die 6.

Figure 3:
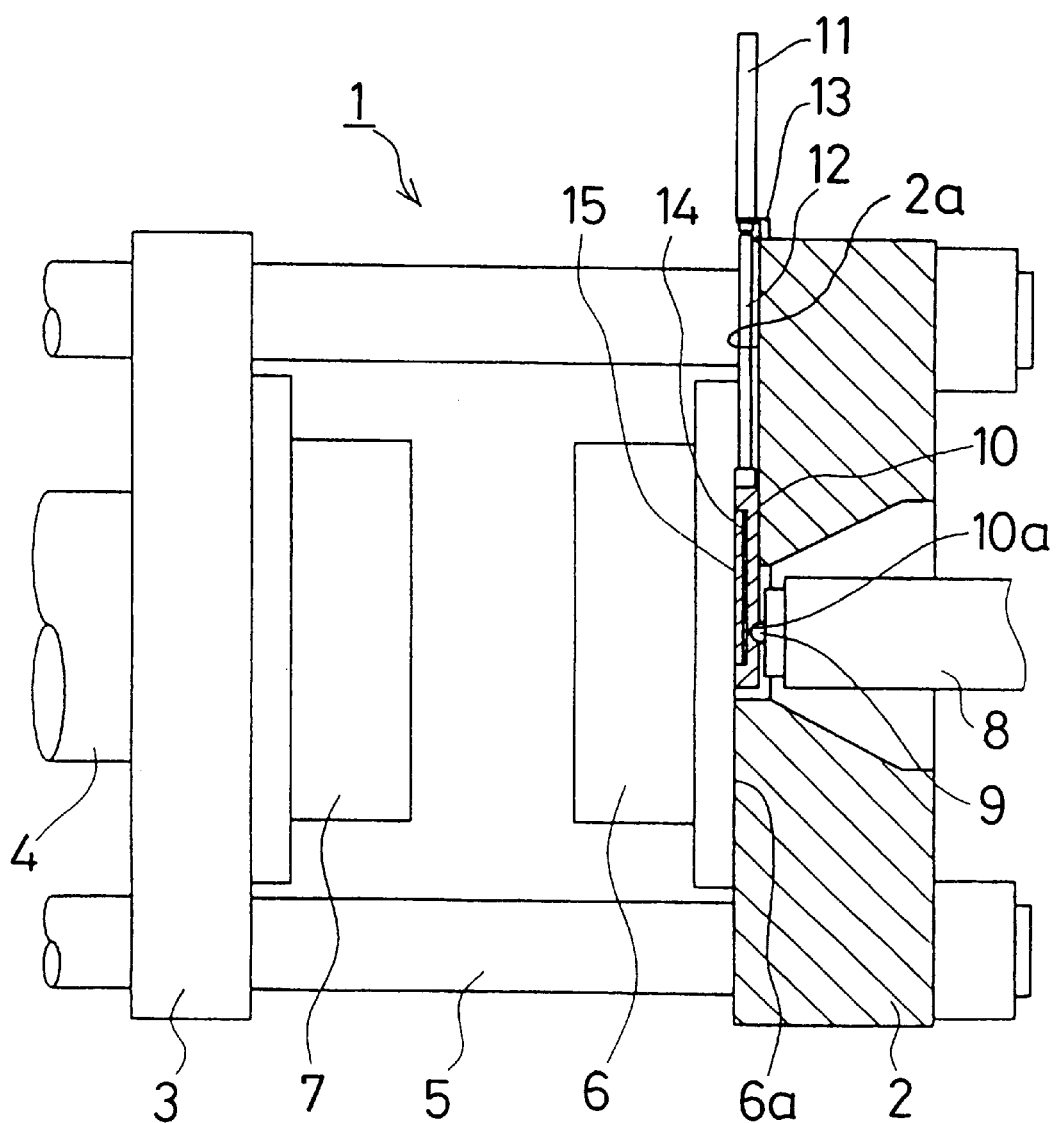
FIG. 3 is a side view showing the operating state different from FIG. 2.

The nozzle touch plate 10 is provided with a spherical recess portion slightly larger in radius than the tip sphere of the nozzle 9 as an abutment portion 10a on the surface opposite to the die, where the nozzle touch plate 10 is coupled with the tip opening 9a of the nozzle 9 when the nozzle touch plate 10 is situated at the closed position (FIG. 3).

Further, a heater 14 is disposed inside of the nozzle touch plate 10 as temperature adjusting means that adjusts its temperature. The heater 14 is fixed to the inside of the nozzle touch plate 10 with holding plate 15 which is provided slidably and in contacting state between the heater 14 and the mounting surface 6a of the fixed die 6 as well as the nozzle touch plate 10. Also, inside the nozzle touch plate 10 is provided a thermo-couple (not shown) as a temperature sensor for detecting the temperature of the nozzle touch plate 10 to which the nozzle 9 abuts and transmits a signal indicative of the detected temperature to a temperature adjusting unit (not shown) disposed externally to adjust the temperature.

Figure 4:
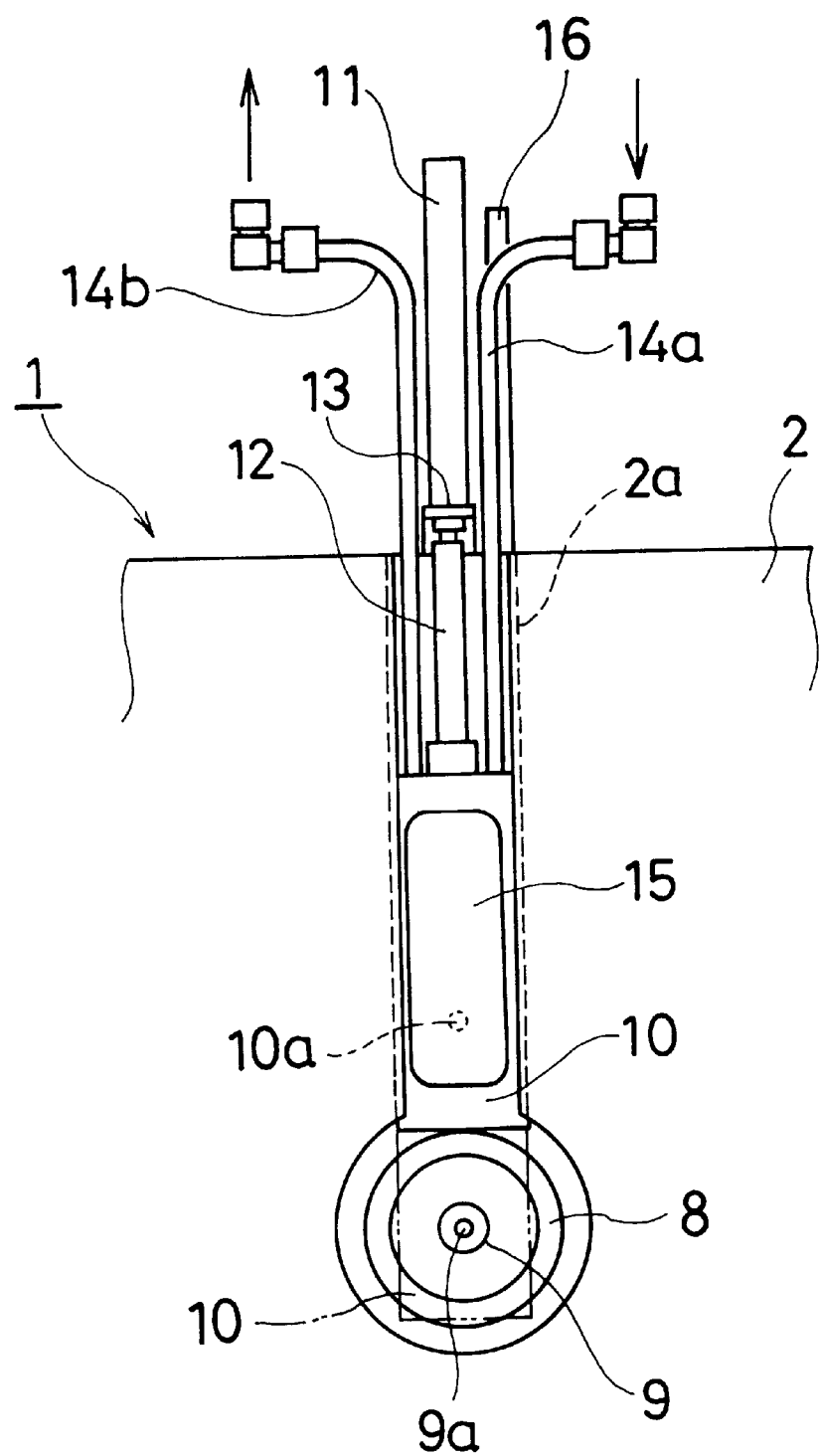
FIG. 4 is a partially enlarged view showing a structure in which a flowing passage is formed in a nozzle touch plate, and a conduit for supplying and circulating a temperature-controlled fluid optimum in temperature to this passage is connected to the passage according to an embodiment of the present invention.

As the heater 14, for example, a flat-plate-like silicon rubber heater that generates heat by the application of electricity can be employed. The capacity of the heater depends on the size of the molding machine, but about 50 to 100 W is suggested if the molding machine with 200 tons in clamping force is used. The wiring of the heater 14 and the lead wire of the thermo couple pass through a pipe 16 provided in the nozzle touch plate 10 and are connected to the external temperature adjusting unit and so on. The heater 14 is not limited to this embodiment, but if it is what can adjust the temperature of the nozzle touch plate 10 to a temperature suitable for the resin material, other structures can be used in such a manner that, as shown in FIG. 4, a passage is provided in the nozzle touch plate 10, and conduits 14a and 14b that supply and circulate the temperature-controlled fluid optimum in temperature for the passage are connected to that passage.

Subsequently, the operation of the molding machine 1 according to the present invention will be described.

The movable platen 3 is moved forward toward the right side in FIG. 3 so as to approach the fixed platen 2 from a state shown in FIG. 3 by the forward movement of the die clamping ram 4, and as shown in FIG. 2, the movable die 7 abuts against the fixed die 6 and the die clamping is carried out. Then, the heating cylinder 8 is displaced forward toward the left side in FIG. 2 by the shift cylinder in such a manner that the nozzle 9 abuts against the sprue bush on the fixed die 6 with a predetermined nozzle touch force. Thereafter, the screw in the heating cylinder 8 is moved forward so that the plasticized and measured material in the heating cylinder 8 is injected into the cavity through the nozzle 9 and the sprue bush.

At this time, the piston rod 12 of the air cylinder 11 is contracted, and therefore the nozzle touch plate 10 is at the retreated position (state shown in FIG. 2).

When the injection filling of the measured resin material into the cavity is completed and a pressure maintenance for keeping the injection pressure for a given period of time is finished, the heating cylinder 8 is slightly displaced backward to the right side in FIG. 3 to the extent where the tip of the nozzle 9 does not interfere with the nozzle touch plate 10. Then, the piston rod 12 of the air cylinder 11 is driven so as to be extended, thereby locating the nozzle touch plate 10 at the closed position. Thereafter, the beating cylinder 8 is displaced forward to the left side in FIG. 2 with a predetermined nozzle touch force by the shift cylinder. Thereby, the tip opening 9a of the nozzle 9 abuts against the abutment portion 10a of the nozzle touch plate 10 with a predetermined nozzle touch force and is closed. In this situation, since a surface of the nozzle touch plate 10 opposing the die side, that is, opposite to the abutment portion 10a is supported due to the contact with the mounting surface 6a of the fixed die 6 mounted on the fixed platen 2 in order to resist a pressure such as the nozzle touch force, the nozzle touch plate 10 is not threatened to be deformed and damaged or the like by the stress of the nozzle touch force. In other words, in the present invention, even if the heating cylinder 8 is displaced forward with a predetermined nozzle touch force, the advancing displacement is stopped by the abutment of the nozzle 9 against the nozzle touch plate 10, accordingly, there is no necessity of stopping the injection nozzle at the closed position as in the prior art. Further, because the tip opening 9a of the nozzle 9 abuts against the nozzle touch plate 10 with the predetermined nozzle touch force, the tip opening 9a is surely closed. However, for example, if a pressure reducing valve is connected to a hydraulic circuit in switching manner that drives the shift cylinder, when the tip portion 9a of the nozzle 9 abuts against the abutment portion 10a of the nozzle touch plate 10 so as to be closed, the nozzle touch force can be reduced, for example, to a predetermined value of about ½.

As soon as the tip opening 9a of the nozzle 9 is closed by the nozzle touch plate 10, the screw is rotated to carry out the plasticizing and measuring process of the resin material. In this process, although a back pressure is generated on the measured resin material which is melted, plasticized and reserved in the front portion of the heating cylinder 8 by the resistant force of the backward movement of the screw which is toward the right side in FIG. 3, however, because the tip opening 9a of the nozzle 9 is closed by the nozzle touch plate 10 against which the top opening 9a abuts with a predetermined nozzle touch force, the molten and plasticized resin material does not leak into the sprue bush on the die or from the tip opening 9a outside. For that reason, after the pressure maintenance and cooling process for the material injected into the cavity defined by the dies 6 and 7 is finished, even during the plasticizing and measuring process the dies can be opened and the molding product can be taken out from the dies (state of FIG. 3). In other words, according to the constitution of the present invention, without waiting for the completion of the plasticizing and measuring process, since the opening of the dies and the take-out of the molding product can be conducted at the same time, the plasticization becomes possible not only for the cooling period as in the conventional injection molding machine but at an arbitrary timing immediately before the injection filling of a succeeding cycle, the plasticization capacity can be increased and the injection filling of the molten resin can be carried out in an optimum state.

Also, since the periphery of the tip opening 9a of the nozzle 9 is heated and adjusted in temperature to the predetermined value by the heat transmission from the heater 14 disposed within the nozzle touch plate 10 while the tip opening 9a of the nozzle 9 is being closed, a phenomenon where the tip portion of the nozzle 9 is cooled so that the fluidity and quality of the resin material is deteriorated is prevented in advance. Further, there arises an effect that stringing, which often causes a problem in molding of thermoplastic resin, caused between the sprue bush on the fixed die and the tip opening of the nozzle is cut off by making the nozzle touch plate displace forward and backward.

In particular, in the case of molding a thermosetting resin material, as shown in FIG. 5, it is desirable to provide a foreign matter removing means in the nozzle touch plate. As a foreign matter removing means, an air blow unit 17 that can arbitrarily jet a compressed air toward the vicinity of the nozzle abutment portion 10a of the nozzle touch plate 10 can be used. In such a structure, the cock 17a of the air blow unit 17 is controlled so as to be released automatically or manually until the heating cylinder 8 is displaced forward so that the tip opening 9a of the nozzle 9 is closed after at least the piston rod 12 of the air cylinder 11 is driven so as to be extended so that the nozzle touch plate 10 is located at the closed position, and the compressed air is jetted from an injection port 17b toward the vicinity of the nozzle abutment portion 10a. As a result, the foreign matter stuck to the nozzle touch plate 10 due to drooling or the like is prevented from being sandwiched between the nozzle abutment portion 10a and the tip opening 9a of the nozzle 9, or prevented from being deposited on the lower portion of the-nozzle touch plate 10, thereby being able to mold continuously without malfunction.

After the plasticizing and measuring process is finished, the process is again returned to the state shown in FIG. 2, and a succeeding cycle is repeated.

According to the invention described in claim 1, due to the above constitution, there can be provided an injection molding machine which does not require to stop an injection unit at a closed position, enables to make a nozzle opening to rapidly abut against a closing member with a sufficient pressing force to surely close the nozzle opening, can surely prevent a resin material from leaking from a nozzle during a plasticizing and measuring process. and can perform the continuous molding process without any problem while keeping the temperature of the resin material in a state suitable for injection, further, since the dies can be opened and closed at the same time as the material plasticizing and measuring process a large capacity of plasticization is realized, thereby being able to mold a large-sized product. Also, since the plasticization is carried out at an optimum timing, a molding product excellent in physical properties can be molded for a short period of time, the fluidity of the material at the nozzle portion can be suitably kept and continuous and stable molding of excellent products becomes possible the increasing of the molding efficiency can be realized.

According to the invention described in claim 2, due to the above constitution, because the foreign matter stuck to the nozzle touch plate is removed, the foreign material can be prevented from being sandwiched between the nozzle touch plate and the nozzle, thereby the continuous molding can be carried out without any malfunction.

What is claimed is:

1. An injection molding machine comprising:

a heating cylinder for injecting a melted and plasticized resin material from a tip opening of a nozzle into a cavity formed within a die;

shift means for enabling said heating cylinder to displace forward and backward with respect to the die and press the nozzle against the die;

a nozzle touch plate for enabling the tip opening of the nozzle of said heating cylinder to close and open; and temperature adjusting means for adjusting the temperature of said nozzle touch plate;

wherein said nozzle touch plate is provided to enable the pressing force by said shift means to be supported when the tip opening of the nozzle of said heating cylinder is closed.

2. An injection molding machine as claimed in claim 1 further comprising foreign material removing means for removing foreign material stuck to said nozzle touch plate.

* * * * *